United States Patent [19]

Scholl et al.

[11] Patent Number: 4,745,172

[45] Date of Patent: May 17, 1988

[54] PHENOLIC RESINS USING POLYAMINES AND POLYETHERS IN THEIR PRODUCTION

[75] Inventors: Thomas Scholl; Reinhard Preuss, both of Krefeld; Manfred Abele, Cologne; Hermann Fries, Bergisch Gladbach; Theo Kempermann, Cologne, all of Fed. Rep. of Germany

[73] Assignee: Bayer Aktiengesellschaft, Leverkusen-Bayerwerk, Fed. Rep. of Germany

[21] Appl. No.: 896,061

[22] Filed: Aug. 13, 1986

[30] Foreign Application Priority Data

Aug. 22, 1985 [DE] Fed. Rep. of Germany ....... 3529985

[51] Int. Cl.4 ............................................... C08G 14/06
[52] U.S. Cl. ................................... 528/162; 525/138; 525/504; 525/509; 528/144; 528/154
[58] Field of Search ....................... 525/509, 504, 138; 528/154, 162, 144

[56] References Cited

U.S. PATENT DOCUMENTS

| | | | |
|---|---|---|---|
| 2,585,196 | 2/1952 | Walton | 525/504 X |
| 2,934,511 | 4/1960 | Auerbach et al. | 525/504 X |
| 3,156,670 | 11/1964 | Soldatos | 528/154 X |
| 3,734,965 | 5/1973 | Becker | 528/162 X |
| 3,857,815 | 12/1974 | Smith et al. | 525/504 X |
| 3,962,156 | 6/1976 | Harrop | 525/942 X |
| 4,020,048 | 4/1977 | Harrop | 528/144 |
| 4,195,151 | 3/1980 | Dunleavy et al. | 525/504 X |
| 4,226,971 | 10/1980 | Waddill et al. | 528/162 |
| 4,273,700 | 6/1981 | Kho | 528/154 X |
| 4,574,145 | 3/1986 | Cummings | 525/509 |

*Primary Examiner*—Howard E. Schain
*Attorney, Agent, or Firm*—Connolly & Hutz

[57] ABSTRACT

Phenolic resins obtained by condensation from alkylphenol, aldehyde, polyamine and polyether in a molar ratio of 1:0.7 to 1.3:0.005 to 0.2:0.001 to 0.3 are suitable as tackifiers for rubber mixtures.

5 Claims, No Drawings

PHENOLIC RESINS USING POLYAMINES AND POLYETHERS IN THEIR PRODUCTION

This invention relates to phenolic resins obtained from alkylphenol, aldehyde, polyamine and polyether.

In the fabrication of rubber articles, such as tires, rollers and hoses, the individual rubber mixtures united with one another have to adhere firmly so that they do not separate from one another again before forming by molding and vulcanization.

Rubber mixtures often show inadequate fabrication tackiness. Accordingly, a tackifier has to be added to the rubber mixtures before processing. In addition to maximum effectiveness, tackifiers must be compatible both with the rubbers and with the other constituents of the mixtures and must not have any significant adverse effect upon processing, vulcanization, ageing and the physical properties of the vulcanizate.

Tackifying resins of monosubstituted phenols, aldehydes and aliphatic or cycloaliphatic polyamines containing at least two primary amino groups are known from DE-OS No. 25 30 819.

Their effect is not yet good enough for practical requirements.

It has now been found that phenolic resins obtained from alkyl or cycloalkylphenol, aldehyde, polyamine and polyether show a tackifying effect superior to that of known phenolic resins.

Accordingly, the present invention relates to phenolic resins obtained by condensation from alkylphenol, aldehyde, polyamine and polyether in a molar ratio of 1:0.7 to 1.3:0.005 to 0.2:0.001 to 0.3.

The reaction mixture is condensed by heating the reaction components together to 95° to 180° C. under pressures of from 1 to 7 bar. The reaction may be carried out in the presence of solvents, such as toluene, xylene or other water-immiscible or only partly water-miscible solvents. However, condensation is preferably carried out in the absence of solvents. The reaction may be catalyzed by acids, for example by p-toluene sulfonic acid, oxalic acid or acetic acid.

Preferred alkylphenols are those containing straight-chain or branched $C_1$-$C_{15}$ alkyl or $C_3$-$C_{15}$ cycloalkyl groups in the o- or p-position. Monoalkylphenols containing branched $C_4$-$C_9$ alkyl groups are particularly preferred.

Suitable aldehydes are formaldehyde and aliphatic aldehydes containing from 2 to 6 carbon atoms, for example acetaldehyde, propionaldehyde, butyraldehyde, croton aldehyde or mixtures thereof.

Formaldehyde may be used in the form of paraformaldehyde, trioxane or aqueous formalin solution, the last form being preferred.

The polyamine component may be, for example, an aliphatic or cycloaliphatic polyamine containing at least two primary amino groups.

Examples are diprimary alkylenediamines containing at least 2 and preferably from 2 to 14 carbon atoms, such as ethylenediamine, 1,2- or 1,3-propylenediamine, di-1,2-propylenetriamine, di-1,3-propylenetriamine, tetramethylenediamine, pentamethylenediamine, hexamethylenediamine, octamethylenediamine; polyethylenediamines corresponding to the formula $H_2N-CH_2CH_2(NHCH_2CH_2)_b-NH_2$, where b is an integer of from 1 to 150, such as diethylenetriamine, triethylene tetramine and tetraethylene pentamine; polyoxyethylenediamines, polyoxypropylenediamines, 3-(2-aminoethyl)-aminopropylamine, 1,2-bis-(3-aminopropylamino)-ethane, N,N'-bis-(3-aminopropyl)-1,4-diaminobutane and 4,7,10-trioxatridecane-1,13-diamine; cycloaliphatic and heterocyclic amines containing above all nitrogen atoms in the ring, such as for example 1,2-, or 1,3-diaminocyclopentane, 1,2-, 1,3- or 1,4-diaminocyclohexane, 3,3'-, 3,4'- or 4,4'-diaminodicyclohexylmethane, 2,2-bis-(4'-aminocyclohexyl)-propane, 4,4'-diamino-3,3'-dimethyldicyclohexylmethane, 3-aminomethyl-3,5,5-trimethylcyclohexylamine (isophorone diamine), N,N'-bis-(3-aminopropyl)-piperazine, N,N'-bis-(2-aminoethyl)-piperazine, 1,3- and 1,4-bis-(aminomethyl)-cyclohexane and 3(4),8(9)-bis-(aminomethyl)-tricyclo[5,2,1,0$^{2,6}$]decane.

It is preferred to use polyamines corresponding to the following formula

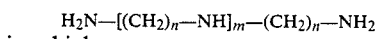

$$H_2N-[(CH_2)_n-NH]_m-(CH_2)_n-NH_2$$

in which
n=2, 3 and
m=3 to 150, preferably 3 to 8, for example tetraethylene pentamine, pentaethylene hexamine, hexamethylene heptamine and mixtures thereof.

The polyethers preferably correspond to the following formula

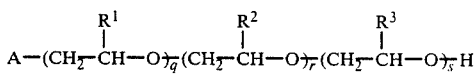

$$A-(CH_2-\underset{R^1}{CH}-O)_q(CH_2-\underset{R^2}{CH}-O)_r(CH_2-\underset{R^3}{CH}-O)_s H$$

in which
$R^1$, $R^2$ and $R^3$ represent hydrogen or $C_1$-$C_{12}$ alkyl,
q, r, s are integers of from 0 to 300,
A represents hydrogen, —OH, —OR$^4$, —OCOR$^4$, NHCOR$^4$ and
$R^4$ represents alkyl, aryl or aralkyl and the sum of q, r and s is at least 2.

Preferred polyethers correspond to the following formula

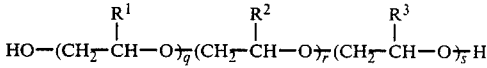

$$HO-(CH_2-\underset{R^1}{CH}-O)_q(CH_2-\underset{R^2}{CH}-O)_r(CH_2-\underset{R^3}{CH}-O)_s H$$

in which
$R^1$, $R^2$ and $R^3$ represent hydrogen or methyl and
q, r and s are integers of from 0 to 200 and the sum of q, r and s is at least 2 and preferably at least 5.

The tackifying resins according to the invention are preferably prepared by initially introducing the mixture of alkylphenol, polyamine and polyether and, after adding the aldehyde, heating for 3 to 5 hours to 95° to 100° C. Thereafter, water is first removed by azeotropic distillation, for example with aromatic solvents, such as toluene or xylene, after which excess phenol is distilled off first under normal pressure and then in vacuo at 120° 180° C. In a preferred process for isolating the resin, the resin solution is worked up after azeotropic removal of the water using a tubular coil evaporator jacketed by a medium heated to a temperature of up to 180° C.

The softening point of the resins obtained is in the range of from 50° 150° C. The resins have an average molecular weight of from 800 to 4000 (weight average determined by gel chromatography).

The resins according to the invention are excellent tackifiers for elastomers, such as natural rubber (NR), styrene-butadiene copolymer (SBR), acrylonitrilebutadiene copolymer (NBR), polybutadiene (BR), polychloroprene (CR), polyisoprene (IR), isobutylene-isoprene copolymer i (IIR), ethylene-propylene terpolymer (EPDM) and mixtures thereof. The resin is present in the rubber mixture in a quantity of from 0.3 to 8% by weight and preferably in a quantity of from 1 to 6% by weight, based on the weight of the rubber. The resins are incorporated by mixing in the usual way.

The resins have a tackifying effect on a variety of different mixtures, such as hose mixtures, roller mixtures, tire mixtures, fabrication mixtures, molding and injection mixtures, to which fillers, such as carbon black, kaolin, silicas or plasticizers, may optionally be added.

No adverse effect upon the processing properties of the rubber mixtures containing the tackifying resins in the usual quantities could be observed.

The tackifying effect was evaluated by a method developed by Applicants themselves instead of the usual method. In this method, the time required for two surfaces to separate under a constant load (principle of a creep test) is measured. This time is directly proportional to the tackifying effect and is a direct measure of tackiness.

Tackiness test

The two ends of a strip-form test specimen measuring 150×20×2 mm are pressed together for 30 seconds over an area of 20×10 mm under a specific pressure of 3.5 MPa after the strip-form test specimen had been formed into a ring at its ends in such a way that the two sides coated with rubber mixture lay on top of one another. The ring thus formed is placed over a free roller. Another movable roller to which different weights may be applied is then suspended in the lower loop. After the load roller has been suspended, the time which it takes the two joined contact surfaces of the test specimen to separate completely from one another is determined (the test is terminated after 300 seconds).

Preparation of the rubber mixtures and test specimens

The mixtures mentioned in the following Examples, of which the fabrication tackiness is to be measured, were mixed in a kneader by the method and in the order normally used in the rubber industry, the tackifying resins and vulcanization accelerators being subsequently incorporated on the mixing rolls.

The test mixtures were drawn out into sheets 1.2 to 1.3 mm thick, the sheets thus formed were placed after storage for 24 hours on a cotton cloth (300×300 mm) coated with polychloroprene adhesive and, after the surface of the mixture had been covered with tracing cloth and the surface of the fabric with cellophane in a 300×300×2 mm frame, the sheets were placed between steel plates and pressed for 5 minutes at 110° C. in a standard multiple-platen press (working pressure 200 kp/cm$^2$). Test specimens measuring 150×20 mm were punched out of the plates thus obtained.

Before tackiness was measured, the tracing cloth was removed and both ends of the test strip coated with n-hexane hexane over an area of 20×10 mm. After evaporation, the test specimens were looped together to form a ring in the manner described above and tackiness measured.

EXAMPLE 1

154 g 35% formalin are added at 90° C. to a mixture of 335 g p-tert.-butylphenol, 16.8 g octaethylene glycol and 22.5 g pentaethylene hexamine. After heating for 4.5 hours to reflux temperature, first the water is distilled off at an internal temperature of up to 150° C., followed by all other volatile constituents in a water jet vacuum up to 170° C. Approx. 350 g of a reddish-brown, solid resin are obtained. Softening point 130° C., $\overline{M}_w = 1400$.

EXAMPLE 2

154 g 35% formalin are added at 90° C. to a mixture of 335 g p-tert.-butylphenol, 6.72 g octaethylene glycol and 22.5 g pentaethylene hexamine, after which the reaction mixture is heated for 4.5 hours to reflux temperature. The reaction product is worked up in the same way as in Example 1. Softening point 135° C., $\overline{M}_w = 1200$.

EXAMPLE 3

365 g 35% formalin is added at 90° C. to a mixture of 910 g p-tert.-octylphenol, 45 g pentaethylene hexamine and 36.4 g polyethylene oxide ($\overline{M}_w$ 800), after which the reaction mixture is heated for 4.5 hours to reflux temperature. The reaction product is worked up in the same way as in Example 1. Softening point 70° C., $\overline{M}_w = 1800$.

EXAMPLE 4

72.5 g 37% formalin is added at 90° C. to a mixture of 167.5 g p-tert.-butylphenol, 11.25 g polyethylene imine ($\overline{M}_w$ 10,000) and 8.4 g of a nenylphenol ethoxylated with 10 times the molar quantity of ethylene oxide, after which the reaction mixture is heated for 4.5 hours to reflux temperature. The reaction product is worked up in the same way as in Example 1. Softening point 88° C., $\overline{M}_w = 1500$.

The test mixture has the following composition:

| | |
|---|---|
| Emulsion-SBR | 103.0 parts by weight |
| Polybutadiene | 25.0 parts by weight |
| Zinc oxide | 5.0 parts by weight |
| Carbon black N 220 | 75.0 parts by weight |
| Aromatic mineral oil plasticizer | 12.0 parts by weight |
| Stearic acid | 2.0 parts by weight |
| Sulfur | 1.8 parts by weight |
| Benzthiazyl-2-cyclohexyl sulfenamide | 1.2 parts by weight |
| Tackifier | 4.0 parts by weight |

| Test | Tackifier | Separation time (secs.) | Load (g) |
|---|---|---|---|
| a | Example 1 | >300 | 250 |
| b | Example 2 | 228 | 250 |
| c | Example 3 | 128 | 375 |
| d | Example 1, DE-OS 25 30 819 | 40 | 375 |
| e | Example 3 | 139 | 500 |
| f | Example 3 without polyether, DE-OS 25 30 819 | 96 | 500 |

Explanations:
a The separation times are average values of 5 measurements.
b The chain lines are intended to identify the individual mixtures. Comparisons should only be made within the same mixture.

We claim:
1. A phenolic resin obtained by condensing
(a) an o- or p-$C_1$-$C_{15}$-alkyl or —$C_3$-$C_{15}$-cycloalkyl-phenol,
(b) an aliphatic $C_1$-$C_6$-aldehyde,
(c) a polyamine corresponding to the formula
$H_2N-[(CH_2)_n-NH]_m-(CH_2)_n-NH_2$ in which n=2 or 3 and m=3 to 150, and (d) a polyether corresponding to the formula

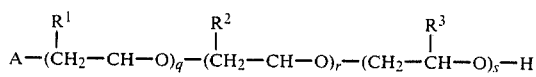

in which $R^1$, $R^2$ and $R^3$ represent hydrogen or $C_1$-$C_{12}$-alkyl, q, r and s are integers of from 0 to 300, A represents hydrogen, —OH, —O$r^4$, —OCOR$^4$, NHCOR$^4$ and $R^4$ represents alkyl, aryl or aralkyl and the sum of q, r and s is at least 2, in a molar ratio a:b:c:d of 1:(0.7 to 1.3):(0.005 to 0.2) : (0.001 to 0.3) at 95° to 180° C. and under a pressure of 1 to 7 bar.

2. A phenolic resin as claimed in claim 1, wherein the aliphatic aldehyde is a monalkyl phenol containing branched $C_1$-$C_9$ alkyl groups.

3. A phenolic resin as claimed in claim 1, wherein the polyamine is an aliphatic or cycloaliphatic compound containing at least two primary amino groups.

4. A phenolic resin as claimed in claim 1, wherein $R^1$, $R^2$ and $R^3$ represent hydrogen or methyl, q, r and s are integers of from 0 to 100 and A represents OH.

5. A process for the production of phenolic resins according to claim 1 characterized in that the alkylphenol, aldehyde, polyamine and polyether are condensed in a molar ratio of 1:(0.7 to 1.3):(0.005 to 0.2):(0.001 to 0.3) at 95° to 180° C. and under a pressure of 1 to 7 bar.

* * * * *